H. W. TAYLOR.
Making Cut Nails.
No. 20,829.
Patented July 6, 1858.
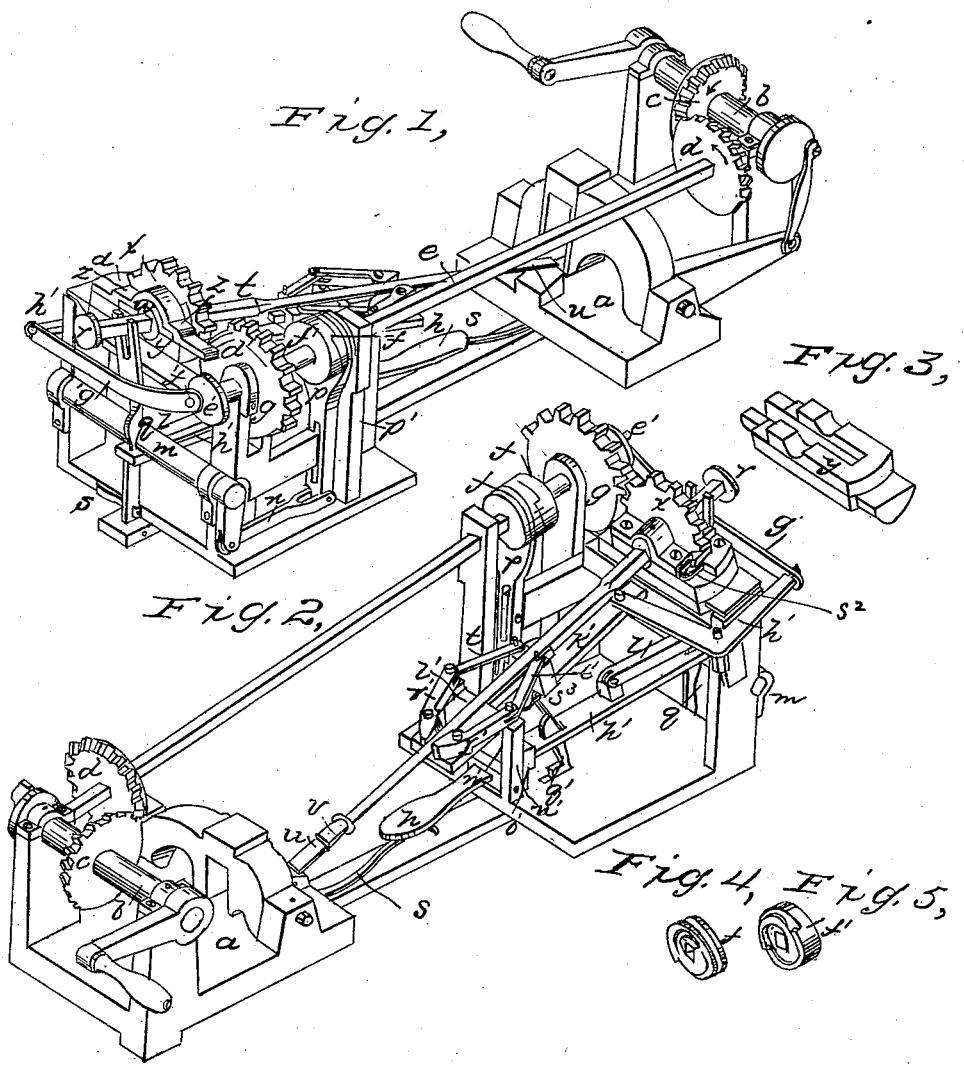

UNITED STATES PATENT OFFICE.

H. W. TAYLOR, OF BIRMINGHAM, PENNSYLVANIA.

NAIL-MACHINE.

Specification of Letters Patent No. 20,829, dated July 6, 1858.

*To all whom it may concern:*

Be it known that I, HIRAM W. TAYLOR, of Birmingham, in the county of Allegheny and State of Pennsylvania, have invented a new and useful Improvement in Feed Apparatus for Nail-Machines; and I do hereby declare the following to be a full, clear, and exact description thereof, reference being had to the annexed drawing, forming part of this specification, in which—

Figure 1 is a perspective representation of my improved nail feeding apparatus, viewed from the end farthest from the nail machine. Fig. 2 is a perspective representation of my improved nail feeding apparatus viewed from the inner end. Fig. 3 represents the rocking journal box. Figs. 4 and 5 represent the two pieces forming the crab connecting the driving shaft with the feeding apparatus.

In the several figures, like letters of reference denote similar parts of my apparatus.

My nail feeding apparatus is so constructed as to be adaptable to nail machines of any ordinary construction, and is designed to do the work usually done by boys, of turning the nail plate over or half around after each nail is severed from it, so as to allow for the taper of the nails and and cut the plate uniformly, and also to advance the nail plate forward between the cutters of the nail machine the required thickness of a nail at each stroke of the nail machine, and to repeat this process, until the whole nail plate (excepting that part held between the jaws of the nippers) is cut up into nails, and then automatically to stop the motion of the feeding apparatus by disconnecting it from the nail machine.

To enable others skilled in the art to make and use my improvement, I will proceed to describe its construction and operation.

In the drawings Figs. 1 and 2, $a$ is the nail machine of the usual construction, to which is attached the driving shaft $b$. On this driving shaft, is a bevel wheel $c$, which gears into the bevel wheel $d$, of the same diameter as $c$. The bevel wheel $d$, is attached near one extremity of the connecting shaft $e$ by which motion is communicated from the driving shaft $b$ (of the nail machine) to the nail feeding apparatus, each revolution of the driving shaft $b$ causing one revolution of the connecting shaft $e$.

As the driving shaft $b$ regulates the movement of the nail machine, it is necessary, that when the feeding apparatus is started by connecting it with the nail machine by means of the crab $f$ $f'$, the feed apparatus should commence to work exactly at the right time in correspondence with the motion of the nail machine, so that the nail plate should remain still while the nail machine is forming and cutting the nails, and not commence to turn the plate, until the upper cutter of the nail machine commences to rise up. This I accomplish by a peculiar construction of the crab $f, f'$, which connects the connecting shaft $e$ with the axis of the segmental wheel $g$.

The sections $f$ and $f'$ of the crab (see Figs. 4 and 5) instead of having as is usual two lugs at the outer edge of their periphery, have only one lug $i\ i$ so situated, on each and therefore the shafts will not couple until the faces of these lugs $i\ i$ come in contact, which they can only do at one point in each revolution of the shaft $e$; but in order to give the necessary strength and uniformity of bearing afforded by having two lugs on each section of the crab, I place a second lug $i'$ on one section $f$ of the crab, so far from the periphery toward the center of the section $f$ that the outer lug $i$ on the other section $f'$ will pass it without locking with it or coming in contact with it. This inner lug $i'$ on section $f$ of the crab, fits into a corresponding recess in the face of the section $f'$, so situate as to lock at the same time when the outer lugs $i\ i$ on the two sections $f, f'$, form a locking connection. Thus when the face of the lug $f$, which slides on the end of the connecting shaft $e$, is brought into contact with the face of the lug $f'$, the shaft $e$ will revolve until it attains the proper position relatively to the feeding apparatus, when the sections of the crab will lock, and the nail feeding apparatus is set in motion. The locking of the two sections of the crab is effected by a treadle $h$, which turns on a pivot at $k$, the long arm $h'$ of which is connected with the lever $l$ which is rigidly attached to a shaft $m$, which by means of the link $n$ and crotch lever $p$, moves the section $f$ of the crab, forward (into connection with the other section $f'$,) when the treadle $h$ is depressed; and backward (unlocking the crab) when the treadle is raised. The treadle $h$ rises by the spring $s$ when not held down by the catching of the extremity of the long arm $h'$ of the treadle in a notch in the spring lever $q$, as seen in Fig. 1. The spring lever $q$, passes through a slot near the extremity of the long arm $h'$, of the treadle. To release the treadle $h'$ from the notch in the spring lever $q$, it is only necessary to press the upper end of this lever $q$ inward when the short arm of the treadle $h$ is raised by the spring $s$ and the shaft $m$ turns, causing the section $f$, to recede from $f'$ and disconnect the feed apparatus from the nail machine. This is done when the apparatus is in operation, automatically, by the button head $r$, of the feed rod $t$ pressing against the crotched end of the spring lever $q$, through which the squared end of the feed rod passes as seen in Figs. 1 and 2. This occurs whenever the feed rod is so far advanced toward the nail machine as to cut up all the nail rod $u$ which projects beyond the nippers $v$. The spring $s'$, acting on the spring lever $q$, just above its pivot, serves to press it outward, and not so strong as to prevent the action of the button end $r$ of the feed rod from acting instantly on the crotched end of the spring lever $q$ to release the treadle $h$ and stop the motion of the feed apparatus.

The feed rod $t$ is inclined downward toward the nail machine, the bottom end $r$, being the highest. The upper end of this feed rod is squared, and is passed through a sleeve $w$ which has a squared central aperture through which the rod $t$, slides backward or forward; externally the sleeve $w$ is a cylindrical shaft forming the axis of the cog wheel $x$. As the cog wheel $w$ turns, the feed rod $t$, turns with it, and at the same time is moved forward through its sleeve $w$ as hereinafter described. The journal box $y$ of this sleeve or axis $w$ of the cog wheel $x$ is shown in Fig. 3. It has a slot from one end nearly to the other, through which the cog wheel $x$ works, and one end of this slot is open to permit the segmental wheel $g$, to enter and gear into the cog wheel $x$. This journal box is not rigidly fixed to the frame of the feed apparatus, but rests on its two ends or journals which are semicylindrical, and rest in bearings on the frame of the feed apparatus: This construction admits of a rocking motion of the journal box $y$, at right angles to the axis of the shaft or sleeve $w$, thus allowing the lower end of the feed rod $t$ to rise as the nail plate turns on the lower cutter of the nail machine; and also allows the lower end of the feed rod to be elevated to insert a fresh nail plate when necessary. In a parallel plane to that of the cog wheel $x$ is placed the segmental cog wheel $g$ the axis of which works in a journal box attached to the frame of the feed apparatus, and in a line with the shaft $e$. On the inner end of the axis of the segmental wheel $g$, is attached the section $f'$ of the crab. This segmental wheel $g$ has one half, at least, of its periphery, devoid of cogs, the remainder having cogs gearing into the cogs in the wheel $x$. The diameter of these wheels $x$ and $g$ is equal or nearly so, the number of cogs on each being so adjusted that each entire revolution of the segmental cog wheel (which is performed during one stroke of the upper cutter of the nail machine,) will turn the cog wheel $x$ and with it the feed rod $t$, and nail plate $u$, half around during the up half stroke of the upper cutter of the nail machine, and leave the nail plate stationary between the cutters during the down half stroke of the upper cutter. The cog wheel $x$ feed rod $t$, and nail plate $u$, remain stationary while the blank portion of the periphery of the segmental cog wheel $g$ passes the tangential point of the cog wheel $x$, and thus is effected the necessary intermittent motion of the nail plate.

As the segmental wheel $g$ does not gear into the cog wheel $x$ when the latter is stationary, their relative position might become changed so that the nail plate would stand stationary more or less on its edge, instead of flat between the cutters, were it not for a contrivance of cams and stops, by which I insure their gearing together at the right point. On the top of the journal box of the sleeve or axis $w$, I place a lever $z$, pivoted to the journal box $y$ at $a'$. This pivoted lever, lies close to the outer face of the cog wheel $x$, and extends over the edge of the segmental wheel $g$, being pressed up to the face of these wheels $x$ and $g$ by a spring $s^2$ (see Fig. 2). On the outer face of the cog wheel $x$ are two lugs $c'$ (Fig. 1) close to the base of the cogs, and equidistant from each other, that is on opposite sides of the center, but on the same face, of the wheel. As the cog wheel $x$ turns in the direction of the arrow in Fig. 1, the end of the lug $c'$, comes in contact with the pivoted lever $z$, which prevents the wheel $x$ from turning any farther; it arrives at this point when the nail plate is turned over and should now remain stationary under the cutters; and at this point also the blank on the segmental wheel $g$ comes opposite the cogs in the wheel $x$, and the wheels are no longer in gear. The lug $c'$ thus prevents the cog wheel $x$ from turning farther around or getting out of place. A wedge or inclined projection $d$, projects from the outer face, of the segmental wheel $g$, just at the termination of the blank space on the periphery of that wheel which pushes back the spring lever $z$, just before the first cog in the segmental wheel $g$, gears into the cog wheel $x$, and allows the cog wheel to revolve again as soon as the half revolution of the wheel $g$, is complete and the cog wheel $x$, and with it the nail plate $u$, should again be turned half around. The wedge $d'$ immediately releases the spring lever $z$, in time to operate again on the instant when the revolution of the cog wheel $x$ should cease and the nail plate $u$ become stationary.

It now remains to explain how the nail plate is fed into the nail machine as the nails are cut from it, and also the manner in which the nail plate is drawn back from between the cutters after each nail is cut, and before the plate is turned, so as to avoid injury to the lower cutter of the nail machine which would result from turning the nail plate on the edge of the cutter. At the outer extremity of the axis of the segmental wheel $g$, is placed a circular plate $e$, from which projects a pin $f'$ which is placed eccentric to the axis of the wheel $g$: and which passes through one extremity of an arm $g'$, the other extremity of which is attached to the bent lever $h'$ so that every revolution of the wheel $g$, (which turns around once for every revolution or stroke of the nail machine) communicates a reciprocatory motion to the slide $k'$.

$l'$ is a rest which is pivoted to a small horizontal shaft $m'$, the journals of which turn in bearings $n'$ fastened to the uprights $p'$, on the frame of the feeding apparatus, to which the treadle $h$ is pivoted (see Fig. 2). These bearings $n'$ may be raised or lowered, so as to adjust the inclination of the feed rod $t$, to bring the point of the nail rod in place, exactly between the cutters. This rest $l'$ has a tongue projecting backward into the slide $k'$, and a spring $s^3$ draws the rest backward from the nail machine, when the rod is to be withdrawn. The motion of the slide $k'$, is regulated by the stroke of the bent lever $h'$, but the stroke of the rest $l'$ is adjusted by the strength of the spring $s^3$, which may be regulated by temper screws passing through the spring $s^3$ into the spring block $q'$, which is pivoted to the bed plate of the feed apparatus. The gripping jaws which hold the lower end of the feed rod are made of four pieces $r'$ $r'$, $t'$ $t'$, $r'$ and $t'$ being united by a pivot, and the upper end of the pieces $t'$ $t'$ being pivoted to the slide $k'$, while the lower end of the pieces $r'$ $r'$ are pivoted to the rest $l'$ as seen in Fig. 2. The operation of this part of my apparatus is as follows. As soon as the nail plate begins to turn by the revolution of the cog wheel $x$ and feed rod $t$, the bent lever $h'$ commences to draw back the slide $h'$. This draws the pieces $t$ $t$ of the gripping jaws back with it, and would loosen entirely the hold of the pieces $r'$ $r'$ on the feed rod, were it not that the spring $s^3$, draws back also the rest $l'$, and the rod is drawn back partly by the hold of the gripping jaws, but the binding of the sleeve $w$ on the squared end of the feed rod caused by the revolution of the sleeve $w$ with the cog wheel $x$ of which it forms the shaft, prevents the feed rod being drawn all the way back, and the strength of the spring $s^3$ regulating the motion of the rest $l'$, while the stroke of the bent lever $h'$ regulating the degree of retrocession of the slide $h'$, the difference of motion causes the ends $r'$ $r'$ of the gripping jaws to catch hold of the feed rod (when it is again pushed forward) a little higher up, thus feeding the rod and nail plate a little farther forward on each stroke. Thus it will be seen that by regulating the strength of the spring $s^3$ the degree of feed given to the nail plate may be nicely adjusted.

So soon as the nail plate is cut up by the nail machine, the button $r$, on the end of the feed rod $t$ touching the crotched end of the spring lever $g$, (as before stated) releases the treadle $h$, disengages the crab, and disconnecting the feed apparatus from the nail machine, stops the motion of the former. The nipper end $v$ of the feed rod is then raised up, and a fresh nail plate inserted, and the process repeated as described.

Having thus described my improvements in feed apparatus for nail machines, what I claim as my invention and desire to secure by Letters Patent is—

1. The use of a rocking journal box for the sleeve of the feeding rod, to permit of the elevation of the lower end of the feeding rod when the nail plate is turned, or when a full nail plate is to be inserted.

2. The combination of the pivoted lever $z$, with the lugs $c'$ on the cogwheel and the inclined projection on the segmental cogwheel, for the purpose of securing their gearing together in the correct relative situation, as hereinafter described.

3. The use of a crab for connecting shafts having one lug nearer the center than the other, so that the inner lug of one half of the crab will pass the outer lug on the other half, without locking, for the purpose of causing them to gear always at the same relative point in their revolution.

4. The use of a button or stop at the head of the feed rod in combination with a lever through the extremity of which the feed rod slides freely until the button or stop touches and presses forward the lever, for the purpose of disconnecting the feed apparatus from the nail machine automatically so soon as the nail plate is worked up.

5. I claim the use of the gripping jaws constructed as described in combination with the rest $k'$, and the spring $s^3$ for the purpose of producing the requisite feed motion of the feed rod $t$.

In testimony whereof I have hereunto set my hand this fourth day of May A. D. 1858.

HIRAM W. TAYLOR.

Witnesses:
 AND. MCMASTER,
 W. BAKEWELL.